United States Patent
Lind et al.

[11] Patent Number: 5,443,035
[45] Date of Patent: Aug. 22, 1995

[54] METHOD OF MILKING

[75] Inventors: Ole Lind, Tumba; Benny Örnerfors, Lycksele, both of Sweden; Hartmut Grimm, Stuttgart; Karl Rabold, Schäbisch Hall, both of Germany

[73] Assignee: Alfa Laval Agri International AB, Tumba, Sweden

[21] Appl. No.: 90,149

[22] PCT Filed: Jan. 15, 1992

[86] PCT No.: PCT/SE92/00021
§ 371 Date: Jul. 22, 1993
§ 102(e) Date: Aug. 23, 1993

[87] PCT Pub. No.: WO92/12625
PCT Pub. Date: Aug. 6, 1992

[30] Foreign Application Priority Data

Jan. 25, 1991 [SE] Sweden ................. 9100242

[51] Int. Cl.⁶ .............................................. A01J 5/00
[52] U.S. Cl. .................................................. 119/14.02
[58] Field of Search ................. 119/14.02, 14.41, 14.47

[56] References Cited

U.S. PATENT DOCUMENTS

| 2,039,421 | 5/1936 | Jansson | 119/14.02 |
| 4,292,926 | 10/1981 | Tilman | 119/14.02 |
| 5,218,924 | 6/1993 | Thompson et al. | 119/14.02 |

FOREIGN PATENT DOCUMENTS

| 126224 | 6/1973 | Denmark . |
| 152321 | 2/1988 | Denmark . |
| 2934537 | 6/1980 | Germany . |
| 3047579 | 1/1986 | Germany . |
| 382547 | 2/1976 | Sweden . |
| 408945 | 7/1979 | Sweden . |
| 453875 | 3/1988 | Sweden . |
| 1450169 | 9/1973 | United Kingdom ..... 119/14.02 |

Primary Examiner—Thomas Price
Attorney, Agent, or Firm—Hovey, Williams, Timmons & Collins

[57] ABSTRACT

In a method of milking an animal by using a milking machine having at least one teat cup (4) with a liner (5) and a pulsation chamber (6), the milking machine is operated to pressurize the pulsation chamber, such that during each pulsation the liner opens and/or closes at a slower rate during the beginning and/or ending periods (I, III, IV) of the milking operation than during the main milk extracting period (II) of the milking operation.

5 Claims, 2 Drawing Sheets

METHOD OF MILKING

BACKGROUND OF THE INVENTION

1. Field of the Invention

The present invention relates to a method of milking an animal by using a milking machine having at least one teat cup with a teat cup liner therein for receiving a teat of the animal, a pulsation chamber being defined between the teat cup and the teat cup liner. There are means for subjecting the pulsation chamber to a pulsating pressure varying between a first pressure and a sub-atmospheric second pressure, which is lower than said first pressure. Each pulsation of said pulsating pressure includes a pressure decreasing phase, during which the pulsating pressure decreases from said first pressure to said second pressure, and a pressure increasing phase, during which the pulsating pressure increases from said second pressure to said first pressure. Means are provided for subjecting the interior of the teat cup liner to said sub-atmospheric second pressure for extracting milk from the animal's teat. The milking of the animal includes in sequence an initial massage period, during which the milk flow begins, a main flow period, during which the milk flow first increases to a main flow and then amounts to said main flow, a flow decreasing period, during which the milk flow at first for a short while amounts to said main flow and then decreases, and a flow terminating period, during which the milk flow ceases.

2. Description of the Prior Art

When milking mechanically it is desirable that the milking of each animal, such as a cow, takes place rapidly, so that the milking machine is efficiently utilized. However, the more rapid the milking operation is carried out, the more rest milk will remain in the udder at the end of the milking operation. Said rest milk must be extracted by manual manipulation of the milking machine, which is labour consuming. Alternatively, the rest milk is simply left in the udder until the next milking occasion, which results in a reduction of extracted milk. In addition, a more rapid milking has the consequence that the teat periodically, especially at the end of the milking, is treated ungently, which may give rise to injuries to the teat and deteriorated udder health.

SUMMARY OF THE INVENTION

The object of the present invention is to provide a method of milking, which enables a relatively rapid milk extraction, reduces the rest milk and results in a gentle treatment of the cow's teats.

This object can be obtained by means of a method of the kind initially stated, which is characterized by operating the milking machine to change the pulsating pressure during at least one of said pressure decreasing phase and said pressure increasing phase of each pulsation at a slower rate during at least one of said massage period, flow decreasing period and flow terminating period than during said main flow period.

As a consequence, the teat cup liner will move slower during opening and/or closing of the interior of the teat cup liner during any of said periods of the milking. A slower opening of the interior of the teat cup liner leads to that the teat has more time to expand radially and maintains its frictional engagement with the teat cup liner, whereby the teat cup is prevented from crawling upwards on the teat towards the udder and from causing a throttling of the milk conducting interior of the teat close to the udder. Such a crawling of the teat cup makes the milking more difficult and gives rise to an increased rest milk. A slower closing of the interior of the teat cup liner means that the teat is treated more gently by the teat cup liner.

During the main flow period, when the larger quantity of the milk is extracted, the pulsating pressure in the pulsation chamber changes at a normal rate, which means that the total milking still can be carried out relatively rapidly.

DETAILED DESCRIPTION OF THE DRAWINGS

Figure 1:
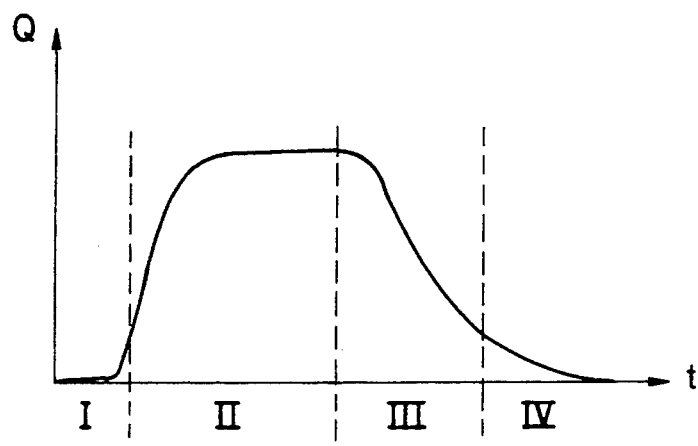
FIG. 1 is a graph illustrating the size of the milk flow during a milking operation.

In the graph according to FIG. 1 there is shown a typical relation between milk flow Q and time t during milking of a cow. During an initial massage period I the teats of the cow are stimulated, so that the milk yield begins. Thereafter a main period II follows, during which the milk flow increases to a main flow, which then is relatively constant during a substantial part of the main period II. After the main period II a milk flow decreasing period III follows, during which the milk flow at first for a short while amounts to the main flow and then steadily decreases. Finally a milk flow terminating period IV occurs, during which the milk flow ceases.

Figure 2:
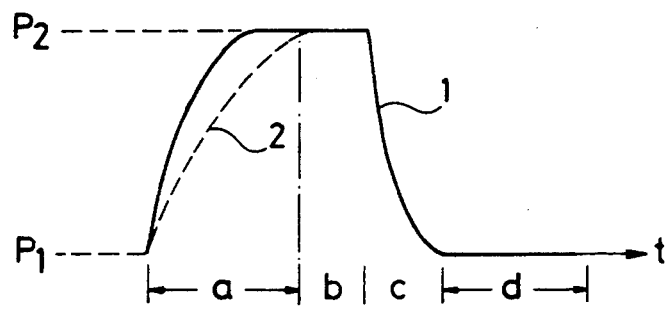
FIG. 2 is a graph illustrating a cycle of the vacuum in the pulsation chamber during milking showing prolonged opening of the interior of the teat cup liner as vacuum increases.
Figure 3:
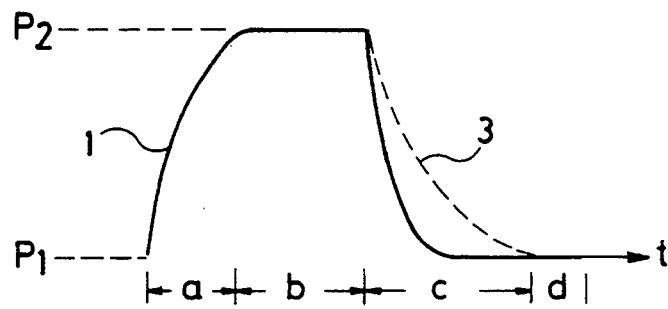
FIG. 3 is a graph illustrating a cycle of the vacuum in the pulsation chamber during milking showing prolonged closing of the interior of the teat cup liner as vacuum decreases.
Figure 4:
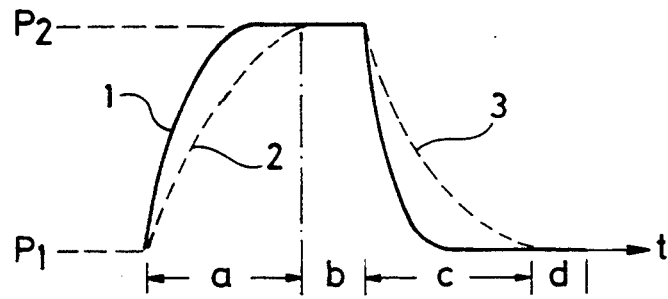
FIG. 4 is a graph illustrating a cycle of the vacuum in the pulsation chamber during milking showing both prolonged opening of the interior of the teat cup liner as vacuum increases and slower closing of the interior of the teat cup liner as vacuum decreases.

In the pressure/time graphs according to FIGS. 2–4, there is illustrated by a continuous line 1 how the pulsating pressure in a pulsation chamber of a teat cup provided with a teat cup liner varies between a high pressure $P_1$ and a low pressure $P_2$ during a pulsation cycle. During an opening phase a (see FIG. 3) the pulsating pressure is decreased from the value $P_1$ to the value $P_2$, which results in that the interior of the teat cup liner is opened and that milk can flow from the teat. During a following milking phase b (see FIG. 2) the pulsating pressure is kept at the value $P_2$, the interior of the teat cup liner being kept open. Then, a closing phase c follows, during which the pulsating pressure according to the line 1 is increased from the value $P_2$ to the value $P_1$, which results in that the interior of the teat cup liner is closed and milk is prevented from flowing from the teat. During a following rest phase d the pulsating pressure is kept at the value $P_1$, the interior of the teat cup liner being kept closed. A pulsation cycle comprising the phases a–d usually lasts between 0.7 to 1.5 seconds.

In the graph according to FIG. 2, there is illustrated by a broken line 2 how the opening phase a is prolonged if the pulsating decreases at a slower rate than along the line 1. The prolongation of the opening phase a means that the interior of the teat cup liner is opened at a slower rate.

In the graph according to FIG. 3, there is illustrated by a broken line 3 how the closing phase c is prolonged if the pulsating pressure increases at a slower rate than along the line 1. The prolongation of the closing phase c means that the interior of the teat cup liner is closed at a slower rate.

In the graph according to FIG. 4, there is illustrated by the broken lines 2 and 3 how both the opening phase a and the closing phase c are prolonged, if the pulsating pressure changes at a slower rate than along the line 1. (The pulsating pressure both increases and decreases at slower rate). Thus, the prolongations of the opening phase a and the closing phase c means that the interior of the teat cup liner is opened and closed at a slower rate during the same pulsation cycle.

Figure 5:
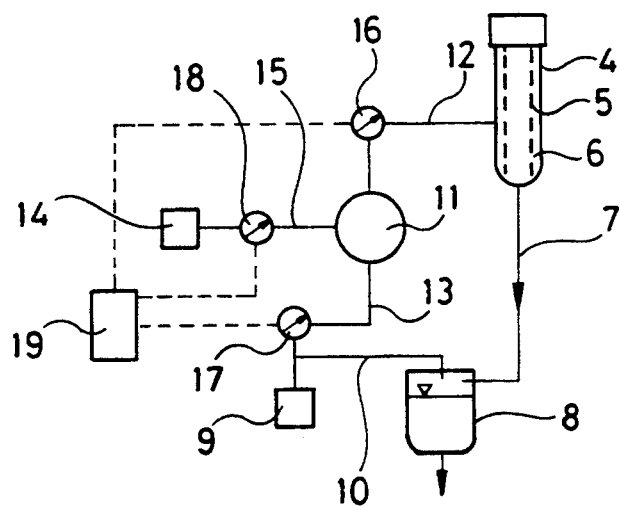
FIG. 5 is a diagrammatic view of a first milking machine for accomplishing the method of the present invention.

The milking machine shown in FIG. 5 comprises a teat cup 4 with a teat cup liner 5, a pulsation chamber 6 being defined between the teat cup 4 and the teat cup liner 5. From the interior of the teat cup liner 5 a milk passage 7 leads to a receptacle 8, the interior of which is subjected to a sub-atmospheric low pressure $P_2$ by a low pressure source 9 via a low pressure passage 10. A pulsator 11 is connected to the pulsation chamber 6 via a pulsation passage 12, to the low pressure source 9 via a low pressure passage 13, and to a high pressure source 14, which generates a high pressure $P_1$, via a high pressure passage 15. The passages 12, 13 and 15 are provided with controllable valves 16, 17 and 18, respectively. A control unit 19 is connected to the valves 16, 17 and 18 for controlling these.

The milking machine according to FIG. 5 is operated in the following way. The low pressure source 9 subjects the interior of the teat cup liner 5 to the low pressure $P_2$ via the passage 10, the interior of the receptacle 8 and the passage 7, while the pulsator alternately subjects the pulsation chamber 6 to the high pressure $P_1$ from the high pressure source 14 via the passages 15 and 12, and to the low pressure $P_2$ from the low pressure source 9 via the passages 13 and 12. When the low pressure $P_2$ prevails in both the pulsation chamber 6 and the interior of the teat cup liner (phase b) the interior of the teat cup liner 5 is fully opened, milk being able to flow from a teat, which is inserted into the teat cup 4 from above, to the receptacle 8 via the passage 7. When the high pressure $P_1$ prevails in the pulsation chamber 6 (phase d) the teat cup liner 5 is flattened below the teat by the resulted pressure difference between the outside and the inside of the teat cup liner 5, so that the interior of the teat cup liner is closed. By means of the control unit 19 and the valves 16–18, the opening and closing rates of the teat cup liner 5 can be optimally controlled during milking. E.g., both the opening rate and the closing rate of the teat cup liner can be reduced by throttling the pulsation channel 12 by means of the valve 16 (FIG. 4). As an alternative, only the opening rate of the teat cup liner 5 may be reduced by throttling the low pressure passage 13 by means of the valve 17 (FIG. 2), or the closing rate of the teat cup liner 5 may be reduced by throttling the high pressure passage 15 by means of the valve 18 (FIG. 3).

One of the opening rate and closing rate of the teat cup liner, or alternatively both, can optionally be reduced during any of the massage period I, the flow decreasing period III and the flow terminating period IV. E.g., both the opening rate and the closing rate of the teat cup liner can be reduced during all of these periods, which gives the best protection against teat cup crawling, the most gentle teat treatment and a small amount of rest milk, but a prolonged milking, since the milking phase b and the rest phase d (the recovery phase of the teat) will be shortened during said periods. As an alternative, the duration of the rest phase d can be kept normal by only reducing the opening rate of the teat cup liner 5, which shortens the milking time somewhat, but gives a somewhat worse teat treatment. Another alternative is to reduce the opening and closing rates of the teat cup liner 5 only during the flow decreasing period III, which substantially reduces the risk of teat cup crawling. Yet another alternative is to reduce the opening rate of the teat cup liner 5 only during the flow decreasing period III and the flow terminating period IV, while the closing rate of the teat cup liner 5 is reduced during the massage period I, the flow decreasing period III and the flow terminating period IV.

Figure 6:
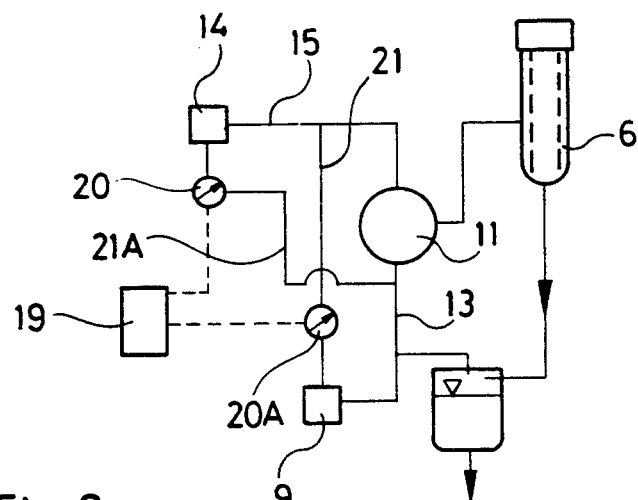
FIG. 6 is a diagrammatic view of a second milking machine for accomplishing the method of the present invention.

The milking machine according to FIG. 6 differs from the milking machine according to FIG. 5 in that the control unit 19 only is connected to a valve 20, which is arranged in a connection passage 21A between the high pressure source 14 and the low pressure passage 13, and to a valve 20 A, which is arranged in a connection passage 21 between the low pressure source 9 and the high pressure passage 15. By means of the control unit 19 and the valve 20, a small leakage from the high pressure source 14 to the low pressure passage 13 via the connection passage 21A can be provided, so that the pressurization of the pulsation space 6 of the low pressure source 9 takes place at a slower rate, whereby the interior of the teat cup liner 5 is opened at a slower rate. As an alternative, a small leakage from the high pressure passage 15 to the low pressure source 9 may be provided by means of the control unit 19 and the valve 20 A, so that the pressurization of the pulsation space 6 by the high pressure source 14 takes place at a slower rate, whereby the interior of the teat cup liner 5 is closed at a slower rate.

Figure 7:
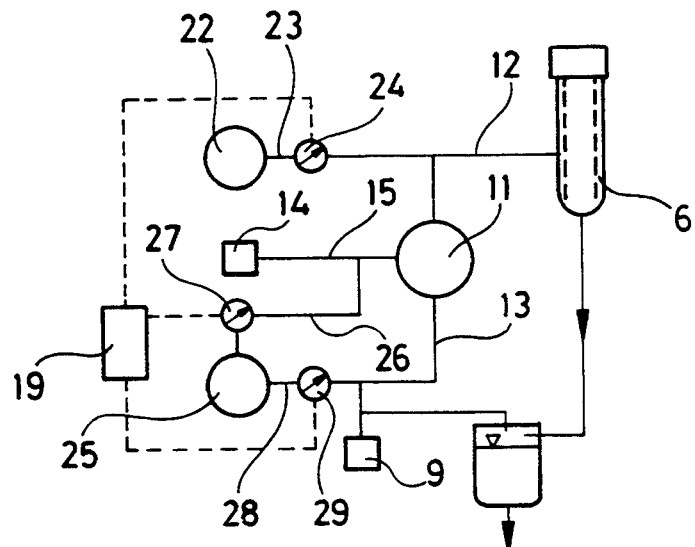
FIG. 7 is a diagrammatic view of a third milking machine for accomplishing the method of the present invention.

The milking machine according to FIG. 7 differs from the milking machine according to FIG. 5 in that an accumulation chamber 22 is connected to the pulsation passage 12 via a passage 23, which is provided with a valve 24, and in that an accumulation chamber 25 is connected to the high pressure passage 15 via a passage 26, which is provided with a valve 27, and to the low pressure passage 13 via a passage 28, which is provided with a valve 29, the control unit 19 being connected to the valves 24, 27 and 29. When the control unit 19 opens the valve 24 during milking, also the accumulation chamber 22 will be alternately pressurized by the pressure sources 9 and 14, which results in that a corresponding pressurization of the pulsation chamber 6 takes place at slower rate, so that the opening and closing rates of the teat cup liner 5 are reduced.

In case it is desirable to decrease only the opening rate of the teat cup liner 5, the control unit 19 controls the valves 27 and 29 during each pulsation cycle, so that during the a-phase the valve 27 is closed while the valve 29 is opened, the accumulation chamber 25 communicating with the low pressure passage 13. When the b-phase begins the control unit 19 closes the valve 29. and then opens the valve 27, so that the accumulation chamber 25 is pressurized by the high pressure source 14. When the d-phase begins the valve 27 is closed, after which the above described operation is repeated during the next pulsation cycle.

In case it is desirable to reduce only the closing rate of the teat cup liner the control unit 19 controls the valves 27 and 29 during each pulsation cycle, so that during the c-phase the-valve 29 is closes while the valve 27 is opened, the accumulation chamber 25 communicating with the high pressure passage 15. When the d-phase begins, the control unit 19 closes the valve 27 and then opens the valve 29, so that the accumulation chamber 25 is pressurized by the low pressure source 9. When the b-phase begins the valve 29 is closed, after which the above described operation is repeated during the next pulsation cycle.

The high pressure source 14 in the milking machine according to FIGS. 5–7 is suitably constituted by atmospheric pressure.

We claim:

1. A method of milking an animal by using a milking machine having at least one teat cup with a teat cup liner therein for receiving a teat of the animal, a pulsation chamber being defined between the teat cup and the teat cup liner, comprising;

providing means for subjecting the pulsation chamber to a pulsating pressure varying between a first pressure and a sub-atmospheric second pressure, which is lower than said first pressure, each pulsation of said pulsating pressure including a decreasing phase (a), during which said pulsating pressure decreases from said first pressure to said second pressure, and a pressure increasing phase (c), during which said pressure increases from said second pressure to said first pressure, providing means for subjecting the interior of the teat cup liner to said sub-atmospheric second pressure for extracting milk from the animal's teat, the milking of the animal including in sequence an initial massage period (I), during which the milk flow begins, a main flow period (II), during which the milk flow first increases to a main flow and then amounts to said main flow, a flow decreasing period (III), during which the milk flow first shortly amounts to said main flow and then decreases, and a flow terminating period (IV), during which the milk flow ceases, and operating the milking machine to change said pulsating pressure during at least one of said pressure decreasing phase (a) and said pressure increasing phase (c) of each pulsation at a slower rate during at least one of said massage period (I), said flow decreasing period (III) and said flow terminating period (IV) than during said main flow period (II).

2. A method of milking according to claim 1, wherein the milking machine is operated to decrease said pulsating pressure during said pressure decreasing phase (a) of each pulsation at a slower rate during said massage period (I), said flow decreasing period (III) and said flow terminating period (IV) than during said main flow period (II).

3. A method of milking according to claim 2, wherein the milking machine is operated to increase said pulsating pressure during said pressure increasing phase (c) of each pulsation at a slower rate during said massage period (I), said flow terminating period (IV) than during and said flow period (II).

4. A method of milking according to claim 1, wherein the milking machine is operated to change said pulsating pressure during each pulsation at a slower rate during said flow decreasing period (III) than during said massage period (I), said main flow period (II) and said flow terminating period (IV).

5. A method of milking according to claim 1, wherein the milking machine is operated to decrease said pulsating pressure during said pressure decreasing (a) phase of each pulsation at a slower rate during said flow decreasing period (III) and said flow terminating period (IV) than during said main flow period (II) and said massage period (I), and to increase said pulsating pressure during said pressure increasing (c) phase of each pulsation at a slower rate during said massage period (I), and said flow terminating period (IV) than during said main flow period (II).

* * * * *